M. C. ASHTON.
CROSS HEAD FOR LOGGING PULLEY BLOCKS.
APPLICATION FILED JUNE 7, 1911.
1,025,668.
Patented May 7, 1912.
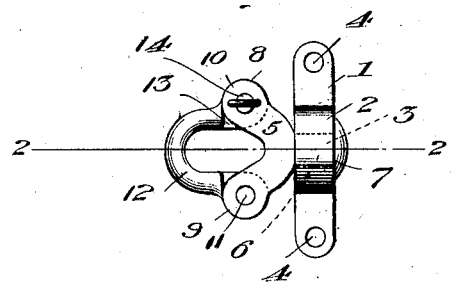
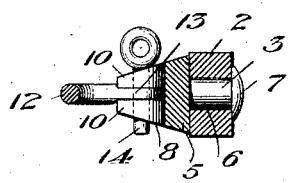
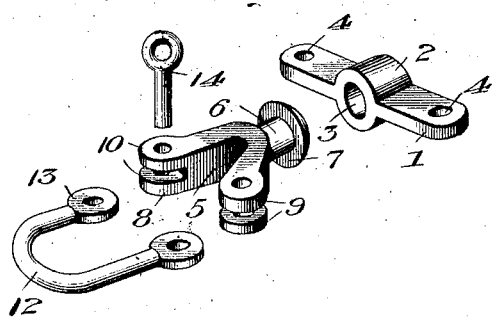
Witnesses
Inventor
Miller C. Ashton
his Attorney

UNITED STATES PATENT OFFICE.

MILLER C. ASHTON, OF DOTY, WASHINGTON.

CROSS-HEAD FOR LOGGING PULLEY-BLOCKS.

1,025,668.

Specification of Letters Patent.   Patented May 7, 1912.

Application filed June 7, 1911. Serial No. 631,830.

*To all whom it may concern:*

Be it known that I, MILLER C. ASHTON, a citizen of the United States, residing at Doty, State of Washington, have invented certain new and useful Improvements in Cross-Heads for Logging Pulley-Blocks, of which the following is a specification.

This invention relates to cross-heads for logging pulley blocks.

Cross-heads for attaching logging pulley blocks to stumps, trees, etc., have to withstand very great strain and twisting actions of various kinds due to the course the cable assumes under different circumstances.

The present invention has for its object the provision of a cross-head for logging pulley blocks which will be of simple, strong, durable and inexpensive construction having a novel swivel connection for attachment to the pulley block to permit the latter to turn or twist and thus prevent the cable or line from fouling and will be provided with a yoke of new construction which may be readily opened or closed to admit the convenient attachment of the anchoring chain or cable.

The invention is set forth fully hereinafter and its novel features are recited in the appended claim.

In the accompanying drawings: Figure 1 is a plan view showing the link closed; Fig. 2, a section on line 2—2, Fig. 1; and Fig. 3, a perspective view showing the parts detached.

The cross-head 1 is made from a solid piece of metal having an enlargement 2 provided with an opening 3 extending therethrough and also provided with openings 4 for the reception of pins by which the cross-head is connected to the eyes on the pulley block.

The yoke 5 is provided with an integral swivel 6 passing through the opening 3 and riveted or provided with a head 7, whereby the yoke is swiveled to freely turn in relation to the cross-head. The yoke is provided with two pairs of ears 8 and 9 disposed in general angular relation to each other, the former being provided with eyes 10, and the latter with a pin 11 on which is pivoted, between the ears 9, a curved link 12 having a flattened part provided with an eye 13 adapted to pass in between the ears 8 so that its eye will be in alinement with the eyes 10 for the convenient reception of a removable locking pin 14.

The cross-head 1 having been suitably fastened to the pulley block, the pin 14 can be removed and the link engaged with a chain or cable fastened around a permanent object such as a tree, after which the link will be secured by the pin. The pin may be provided with a nut or cotter or any other means for preventing it from dropping out. The link being held securely, the yoke may turn therein as the pulley twists according to the angle which the cable passing around the pulley may assume.

Having thus described my invention, what I claim as new, and desire to secure by Letters Patent, is:—

A cross-head for logging blocks having eyes for its connection to an object, a substantially Y-shaped yoke whose stem is swiveled to the cross-head and whose branches are provided with ears, a one-piece loop-shaped swinging link having one end disposed between and permanently pivoted to one pair of said ears and its other end free and adapted to be passed in between the pair of ears, and a removable fastening adapted to be passed through the ears last named and through the free end of the link, whereby the link may be swung open without detachment on removing of said fastening.

In testimony whereof, I hereunto affix my signature in presence of two witnesses.

MILLER C. ASHTON.

Witnesses:
W. H. PHILLIPS,
T. B. STIDHAM.